United States Patent
Losfeld et al.

(10) Patent No.: US 7,048,996 B2
(45) Date of Patent: *May 23, 2006

(54) TEMPERATURE RESISTANT MATERIAL COMPRISING SHORT METAL FIBERS

(75) Inventors: Ronny Losfeld, Waregem (BE); Lieven Anaf, Waregem (BE)

(73) Assignee: N.V. Bekaert S.A., Zwevegem (BE)

( * ) Notice: Subject to any disclaimer, the term of this patent is extended or adjusted under 35 U.S.C. 154(b) by 174 days.

This patent is subject to a terminal disclaimer.

(21) Appl. No.: 10/450,252

(22) PCT Filed: Dec. 10, 2001

(86) PCT No.: PCT/EP01/14650

§ 371 (c)(1),
(2), (4) Date: Jun. 12, 2003

(87) PCT Pub. No.: WO02/47855

PCT Pub. Date: Jun. 20, 2002

(65) Prior Publication Data

US 2004/0029705 A1   Feb. 12, 2004

(30) Foreign Application Priority Data

Dec. 13, 2000   (EP) .................. 00204497

(51) Int. Cl.
*B32B 5/02*      (2006.01)
*B32B 18/00*     (2006.01)
*C03C 13/00*     (2006.01)

(52) U.S. Cl. .............. 428/293.4; 428/294.4; 428/311.11; 428/312.2; 19/98; 19/145.7; 19/145.5; 501/35; 50s)1/95.2

(58) Field of Classification Search ............. 428/293.4, 428/294.4, 311.11, 312.2; 19/98, 145.7, 19/145.5; 501/35, 95.2
See application file for complete search history.

(56) References Cited

U.S. PATENT DOCUMENTS

| | | | | |
|---|---|---|---|---|
| 3,607,608 A * | 9/1971 | Siefert | ......................... | 501/35 |
| 3,670,485 A * | 6/1972 | Brown et al. | .................. | 57/327 |
| 4,703,898 A * | 11/1987 | Nakagawa et al. | ........... | 241/30 |
| 4,764,488 A * | 8/1988 | Saito et al. | ................. | 501/95.2 |
| 4,776,885 A * | 10/1988 | Nakagawa et al. | ........... | 75/229 |
| 5,294,387 A * | 3/1994 | Nakano et al. | .......... | 156/89.26 |
| 5,459,114 A * | 10/1995 | Kaya et al. | ................. | 501/95.2 |
| 5,664,628 A * | 9/1997 | Koehler et al. | ............. | 166/369 |
| 5,909,773 A * | 6/1999 | Koehler et al. | ............. | 166/277 |
| 6,152,978 A * | 11/2000 | Lundquist | .................. | 55/385.1 |
| 6,864,199 B1* | 3/2005 | Doza et al. | ................ | 501/95.1 |
| 2003/0036324 A1* | 2/2003 | Davidovics et al. | | |

FOREIGN PATENT DOCUMENTS

| | | | |
|---|---|---|---|
| GB | 889583 | | 2/1962 |
| JP | 63-137139 | * | 6/1988 |
| JP | 63-182266 | * | 7/1988 |

(Continued)

*Primary Examiner*—Jennifer McNeil
*Assistant Examiner*—Jason L. Savage
(74) *Attorney, Agent, or Firm*—Foley & Lardner LLP (57) ABSTRACT

A temperature resistant material, comprising a temperature resistant matrix and a set of short metal fibers, which characterized in that the set of short metal fibers represents at least 0.5% by weight of the temperature resistant material. The set of short metal fibers has an equivalent diameter D in the range of 1 to 150 μ, and comprising curved fibers and entangled fibers. The curved fibers have an average length L in the range of 10 to 2000 μ.

19 Claims, 5 Drawing Sheets

FOREIGN PATENT DOCUMENTS

| | | |
|---|---|---|
| JP | 2-175803 A | 7/1990 |
| JP | 2000-281402 A | 10/2000 |
| WO | WO 96/08302 A2 | 3/1996 |
| WO | WO 98/31491 A1 | 7/1998 |

* cited by examiner

Fig. 4

TEMPERATURE RESISTANT MATERIAL COMPRISING SHORT METAL FIBERS

FIELD OF THE INVENTION

The invention relates to temperature resistant materials such as ceramic material, ceramic glue or temperature resistant glue comprising short metal fibers. The invention further relates to a method to improve thermal shock resistance of temperature resistant glues and ceramic materials.

BACKGROUND OF THE INVENTION

High temperature resistant glues, e.g. ceramic glues, are known in the art. Such glues have in general the disadvantage to become relatively brittle after an exposure to (too high) temperatures, or degrade in time when subjected to thermal shocks, showing brittleness and small cracks. Ceramic materials and structures, being resistant to increased temperatures, also become brittle and show small cracks due to thermal shocks with relatively important temperature differences.

Further, it is known to add metal powder to glues to render the glue electro-conductive properties.

Short metal fibers in general are known in the art.

Metal fibers having a rather flat cross section, with diameter less than 15 µm and a length of less than 400 µm are known from U.S. Pat. No. 4,703,898.

These fibers have a crescent shape and have a small, point-like hook at both ends.

JP2175803 describes similar short metal fibers, which have a curved shape.

Short metal fibers are also known from GB889583. These metal fibers may be undulated or "kinked" over their length. In this document, these terms mean that the major axis of the fibers change two or more times over the length of the fiber.

SUMMARY OF THE INVENTION

According to the present invention, a temperature resistant material, such as a ceramic material, ceramic glue or temperature resistant glue, comprises a temperature resistant matrix and a set of short metal fibers. The set of short metal fibers represents at least 0.5% of weight of temperature resistant material.

The temperature resistant matrix, used to provide a temperature resistant material, is preferably ceramic material, ceramic glue or temperature resistant glue. Preferably, ceramic matrices or ceramic glues based on $SiO_2$, $Al_2O_3$, $ZrO_2$ and/or $MgO$ are used.

A set of short metal fibers used to provide the temperature resistant material as subject of the invention is characterized by the presence of two different groups of short metal fibers, being "entangled" fibers and "curved" fibers.

A set of short metal fibers as subject of the invention comprises short metal fibers with an equivalent diameter "D" between 1 and 150 µm preferably between 2 and 100. Most preferably the equivalent diameter ranges between 2 and 50 µm or even between 2 and 35 µm such as 2, 4, 6.5, 8, 12 or 22 µm.

With the term "equivalent diameter" is meant the diameter of an imaginary circle, which has the same surface as the surface of a fiber, cut perpendicular to the major axis of the fiber.

The set of short metal fibers comprises entangled fibers. The number of entangled fibers in a set of short metal fibers as subject of the invention ranges from 5 to 35%. Preferably more than 10% of all short metal fibers in the set of short metal fibers are entangled. These fibers are hereafter referred to as "entangled fibers". To have a statistically reliable percentage, a sample of at least 50 fibers, randomly chosen out of the set of short metal fibers are to be evaluated.

The percentage of entangled fibers is measured and calculated as:

% entangled fibers=100×(#entangled/#total)

wherein entangled=number of entangled fibers out of the sample;
total=number of fibers out of the sample.

The entangled fibers of the set of short metal fibers as subject of the invention have an average length "Le", which is considerably longer as the average length of the curved fibers "Lc". The average length of the entangled fibers is at least 5 times the average length of the curved fibers. Preferably, the average length of the entangled fibers is more than 10 times the average length of the curved fibers. Preferably, the average length of the entangled fibers is larger than 200 µm, or even more than 300 µm, most preferably more than 1000 µm. The entangled fibers may be entangled with themselves (individually) or may be entangled together with some other entangled fibers. The entangled fibers, either individually or together with other entangled fibers, cannot be individualized as an essentially straight fiber out of the shape, which is defined by the entanglement of the fibers. The major axis of each fiber changes so often and unpredictably, that the fiber may be entangled in many different ways. Some of the fibers are present in a shape, which resembles to a clew. The effect is comparable to the so-called pilling effect, well known in the textile industry, and in carpet industry more in particular. One or more fibers get trapped into a small ball. The trapped fibers may not be separated from this ball anymore. Other fibers look more like a pigtail. They are characterized by a major axis which changes several times in an unpredictable way, so a relatively chaotic shape may be provided.

The other short metal fibers out of the set of short metal fibers are hereafter referred to as "curved" fibers.

The average length "Lc" of the curved fibers of the set of short metal fibers may range from 10 to 2000 µm, preferably from 30 to 1000 µm such as 100 µm, 200 µm or 300 µm. When a length distribution is measured from these curved fibers as part of a set of short metal fibers as subject of the invention, a gamma-distribution is obtained. This gamma-distribution is identified by an average length Lc and a shape factor "S". According to the present invention, the gamma-distribution of the length of the curved fibers, has a shape factor S ranging between 1 and 10.

For average lengths Lc larger than 1000 µm, usually a shape factor S lager than 5 is measured. For average lengths Lc between 300 µm and 1000 µm, a shape factor S between 2 and 6 is usually measured. For average lengths Lc smaller than 300 µm, usually a shape factor S smaller than 3 is measured. To have a statistically reliable distribution, at least 50 curved fibers, randomly chosen out of the set of short metal fibers are to be measured.

The L/D ratio of a set of short metal fibers as subject of the invention has an L/D-ratio of more than 5, preferably more than 10, wherein L is the average length of all fibers, present in a representative sample of fibers from the set of short metal fibers. As described above, this sample comprises at least 50 fibers out of the set of short metal fibers. Preferably, but not necessarily, the curved fibers out of a set of short metal fibers as subject of the invention has an Lc/D-ratio of more than 5, preferably more than 10.

Further, a majority of these curved fibers have a major axis, which changes over an angle of at least 90°. This angle is the largest angle which can be measured between two tangents of this major axis. Preferably, 40% of the curved fibers has a major axis, changing more than 900, e.g. more than 45%, or preferably more than 50%. To measure these curves of the major axis, a microscopic image with appropriate enlargement is taken from several short metal fibers. Using a computer imaging system, the tangents of the major axis and the largest angle between them is calculated. To have a statistically reliable sample, at least 50 curved fibers, randomly chosen out of the set of short metal fibers are to be measured.

A blend of short metal fibers and ceramic matrix or ceramic or high temperature resistant glue, comprising up to 15% or even 20% by weight of short metal fibers, seems to resist thermal expansions to a larger extend, compared to the pure ceramic or high temperature resistant glue, once the glue or matrix comprising short metal fibers are cured. A higher resistance to thermal cracks in the glue was obtained. These positive results were obtained especially when a set of short metal fibers is used which comprises entangled and curved fibers of which more than 10% of the set of short metal fibers are individually entangled fibers.

Surprisingly, only a relatively small change in electrical conductivity was noticed when the amount of the set of short metal fibers is kept lower than 10% by weight of the temperature resistant material, e.g. in the range of 1% to 9.5%, in the mean time providing sufficient resistance to thermal shocks and cracks. Higher percentages by weight of a set of short metal fibers may be used, e.g. more than 15% or even more than 20% or 30%, however such percentages of weight are not absolutely necessary to obtain a sufficient resistance to thermal shocks.

Short metal fibers having curved and entangled fibers may be obtained by a method comprising the following steps. First, metal fibers, being present in a bundle of fibers, in a yarn or a textile structure, or even as staple fibers, are individualized to some extend by a carding operation.

These more or less individualized fibers are brought into a comminuting device. In this device, each fiber is cut into short metal fibers by fast rotating knifes. The blade of these knifes, having a certain blade thickness, encounter or 'hit' the fibers usually in radial direction. The fibers are mechanically plastically deformed and entangled or possibly broken into a smaller length. Due to the centrifugal force, the so provided short metal fibers (curved or entangled) are blown outwardly against the external wall of the comminuting device. This external wall comprises a sieve with well-defined openings. According to these openings, short metal fibers with a certain length may pass through the sieve, whereas too long short metal fibers will stay in the comminuting device and possibly be hit once again, until the lengths are sufficiently small to pass the sieve, or until they are entangled enough to allow passage through the sieve.

According to the specific use of the short metal fibers, different metals and/or alloys may be used to provide the short metal fibers. The alloy of the metal fibers is to be chosen in order to provide required properties such as temperature resistance or electrical conductivity. Stainless steel fibers out of AISI 300-type alloys, e.g. AISI 316L or fibers based on INCONEL®-type alloys such as INCONEL®601 or NICROFER®-type alloys such as NICROFER® 5923 (hMo Alloy 59) and NICROFER 6023, or fibers based on Fe—Cr—Al alloys may be used. Also Ni-fibers, Ti- fibers, Al-fibers, Cu-fibers or fibers out of Cu-alloy or other alloys may be used.

Metal fibers may e.g. be bundle drawn or shaved, or provided by any other process as known in the art.

The set of short metal fibers and the temperature resistant matrix are blend using techniques as known in the are. Usually, a curing procedure is to be followed after the application of the uncured temperature resistant material, especially in case the temperature resistant material is a temperature resistant glue.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1A:
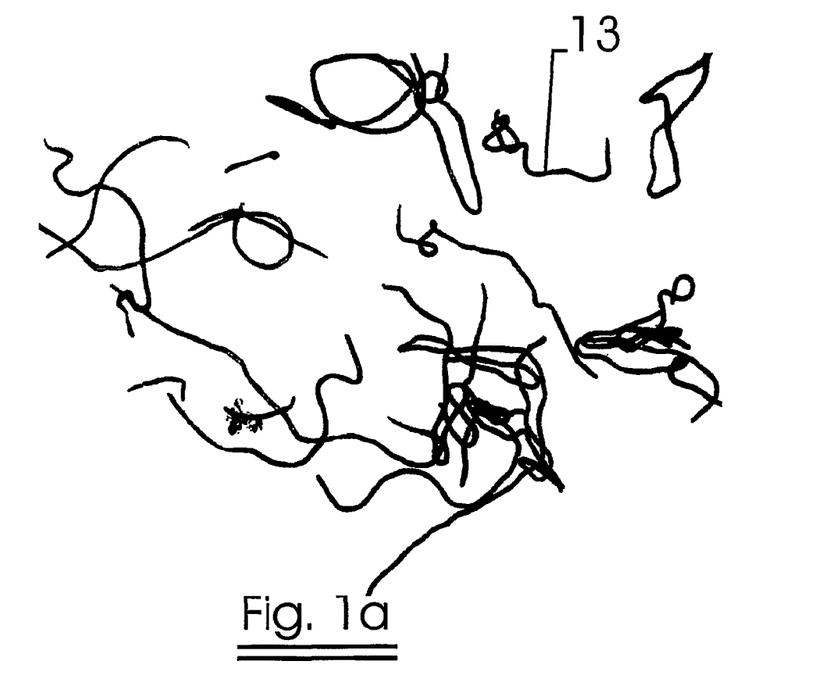
FIGS. 1A, 1B, 1C, 1D, 1E and 1F are images of short metal fibers, all being part of a set of short metal fibers comprising curved and entangled short metal fibers.
Figure 1B:
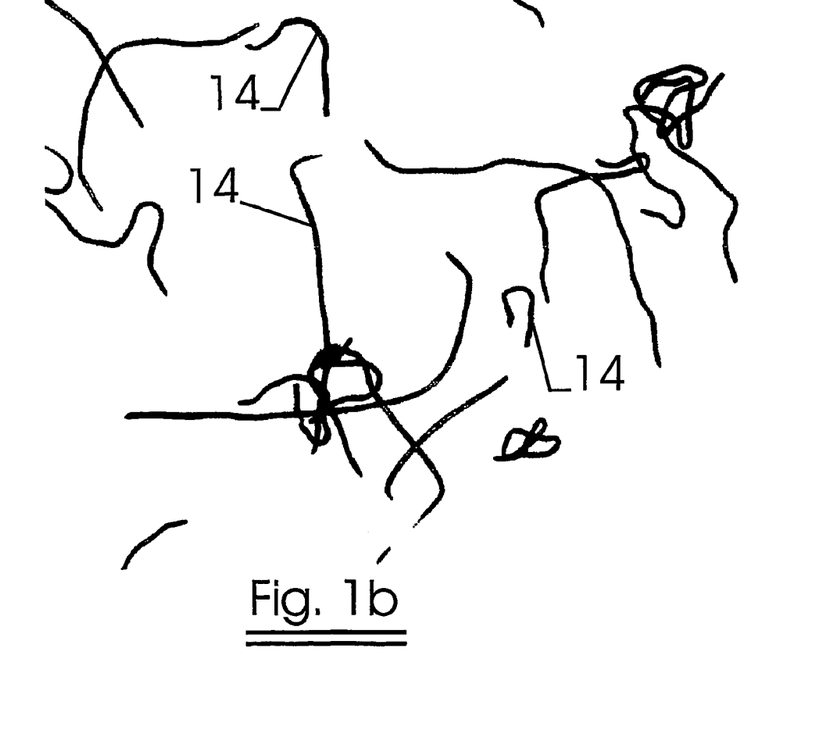
Figure 1C:
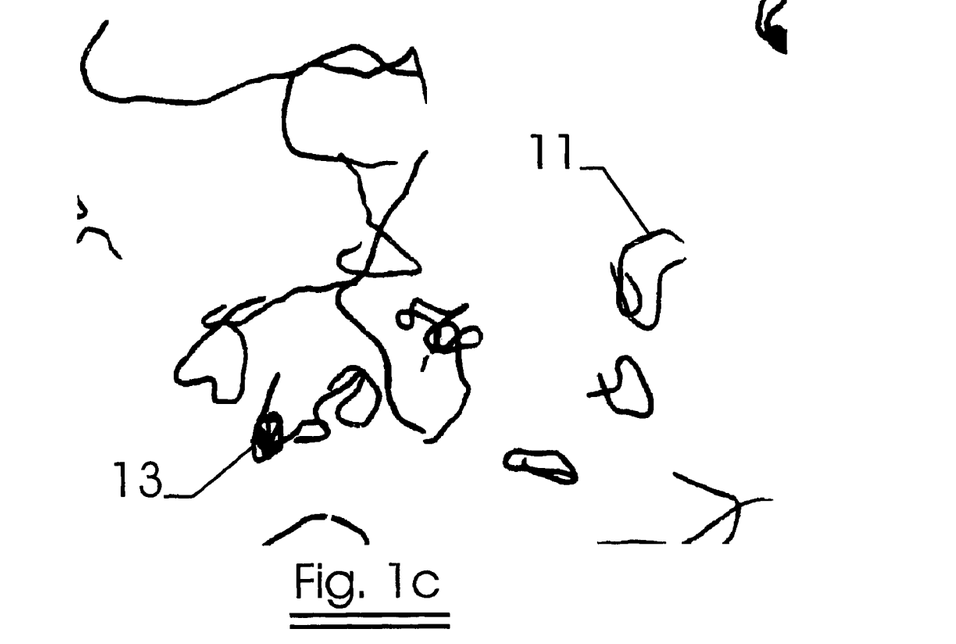
Figure 1D:
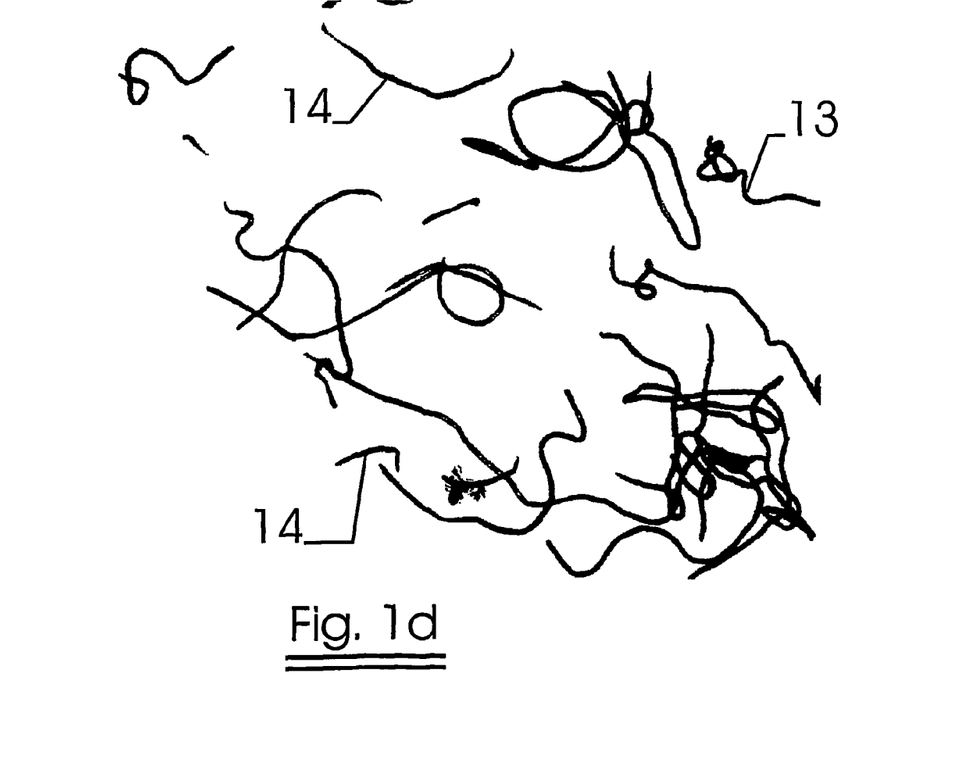
Figure 1E:
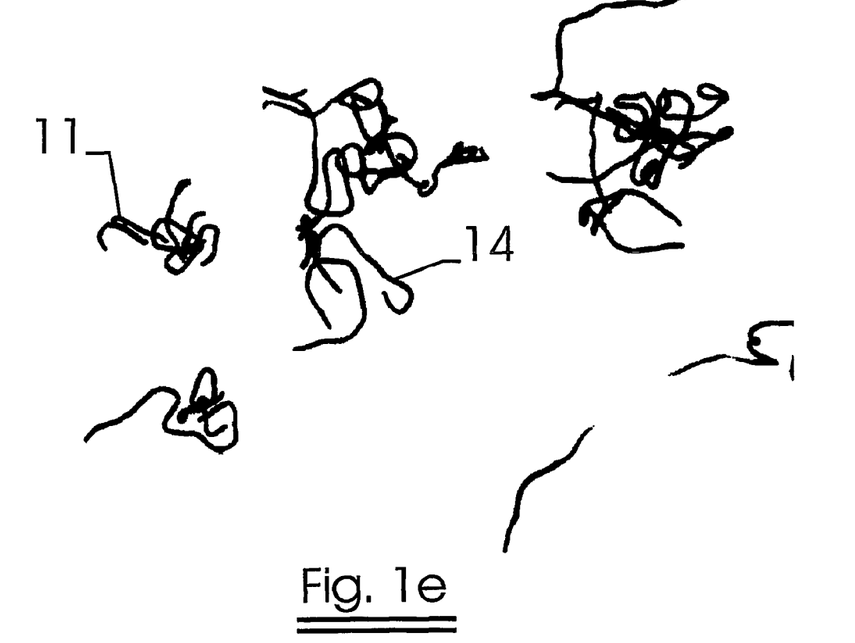
Figure 1F:
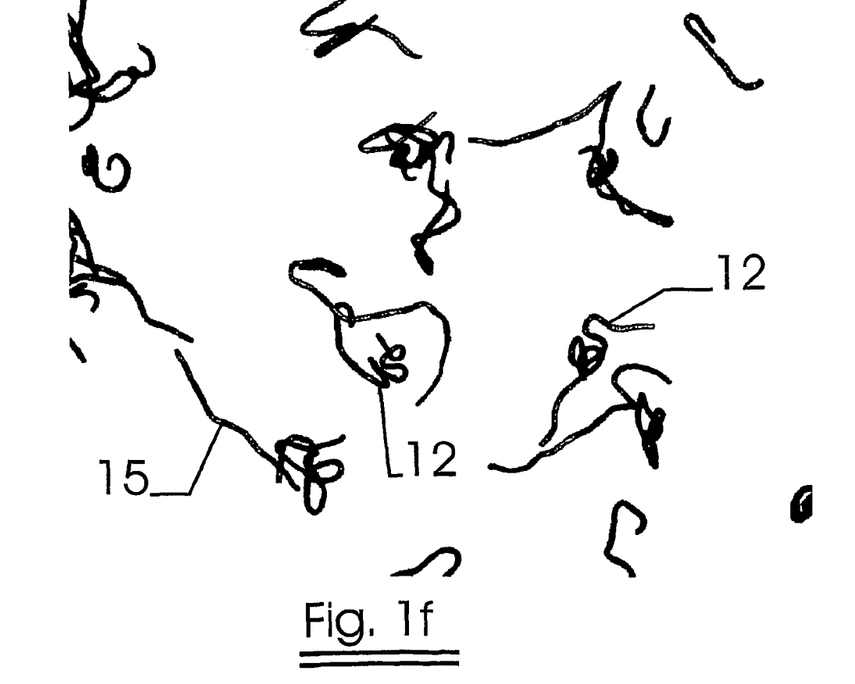
Figure 2:
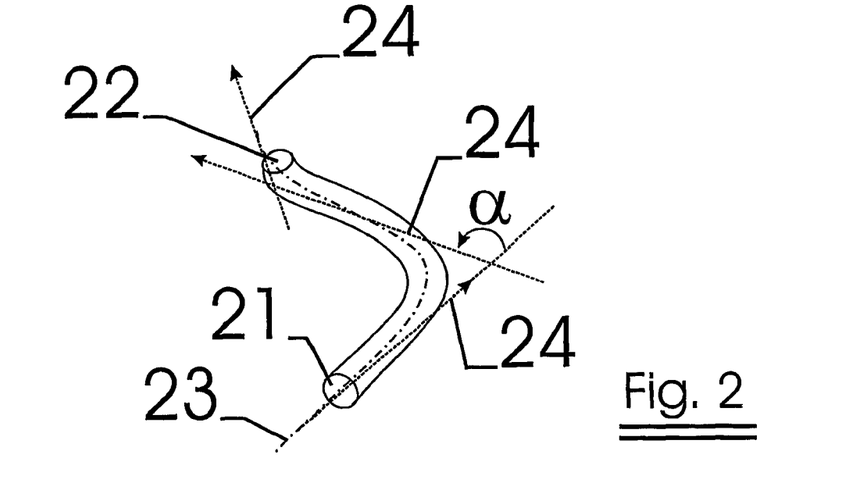
FIG. 2 shows a curved fiber being part of a set of short metal fibers as subject of the invention.

A preferred embodiment of a set of short metal fibers is shown in FIGS. 1A, 1B, 1C, 1D, 1E and 1F, which all show short metal fibers out of the same set of short metal fibers. The short metal fibers, having an equivalent diameter of 22 µm, are obtained by providing a bundle of AISI 316L bundle drawn fibers of a carding device and further to a comminuting device. As may be seen from FIGS. 1A to 1F, the shape of the short metal fibers may be very different. Some short metal fibers are clearly entangled fibers, such as fibers 11, 12 and 13. Fibers 12 are more curled irregularly, providing a non-defined shape. Fibers 13 are individually entangled to a non-defined shape. Fibers 11, 12 and 13 are to be understood as "entangled fibers". Other fibers 14 are clearly curved, although the curving angles are unpredictably. Some curved fibers, such as fiber 15, may have a limited curvature. An example of such a curved fiber is shown schematically in FIG. 2. A curved fiber has two ends, being a first end 21 and a second end 22. A major axis 23 connects the center of the transversal cuts over the whole length of the fiber. The direction of the major axis 23 changes over an angle α. Angle a is absolute value of the largest angle which can be measured between two vectors 24 having a direction equal to the tangent of the major axis, starting point being a point of the major axis, and a sense pointing from first end 21 to second end 22.

Figure 3:
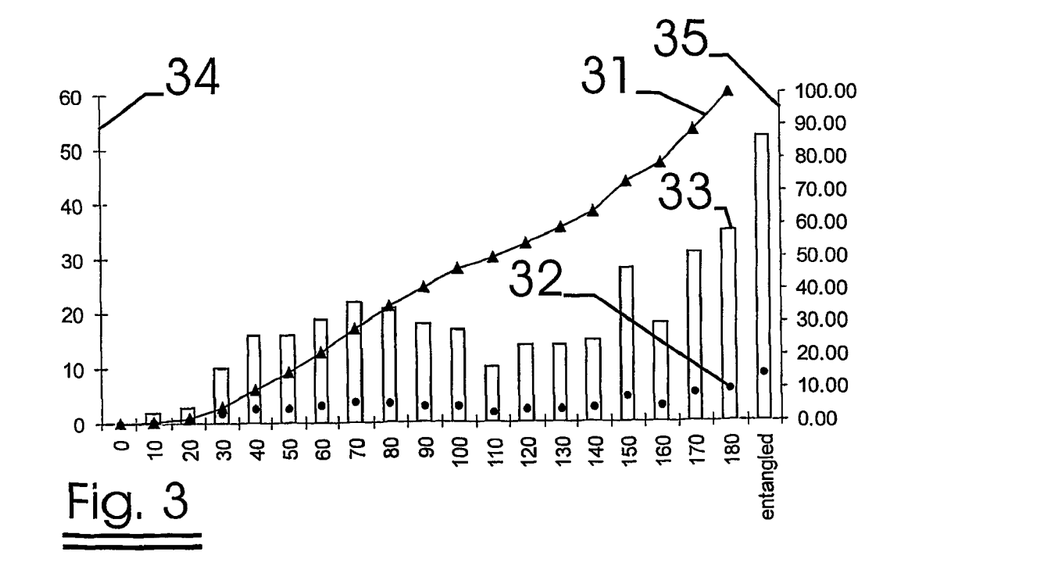
FIG. 3 shows a graph of the length distribution of a set of short metal fibers as subject of the invention.

FIG. 3 shows the angle distribution of the change of major axis of the curved fibers of the set of short metal fibers from FIGS. 1A to 1F. A sample to 316 fibers, randomly chosen out of the total set of short metal fibers was taken. Each bar 33 in the graph represents the number of fibers (to be read at the left ordinate 34), having a major axis changing with an angle α, α being smaller than the angle value underneath the bar, which is related to that bar, but larger than the angle, related to the bar at its left side. E.g. the bar related to 90°, indicates the number of curved fibers, having an angle a smaller than 90°, but larger than 80°. Related numbers are summarized in Table I

TABLE I

| angle α of fibers | number in sample | % curved with α/total curved fibers | % curved with angle α or entangled/total fibers |
|---|---|---|---|
| 0 | 0 | 0.00 | 0.00 |
| 10 | 2 | 0.65 | 0.55 |
| 20 | 3 | 0.97 | 0.83 |
| 30 | 10 | 3.24 | 2.77 |
| 40 | 16 | 5.18 | 4.43 |
| 50 | 16 | 5.18 | 4.43 |
| 60 | 19 | 6.15 | 5.26 |
| 70 | 22 | 7.12 | 6.09 |
| 80 | 21 | 6.80 | 5.82 |
| 90 | 18 | 5.83 | 4.99 |
| 100 | 17 | 5.50 | 4.71 |
| 110 | 10 | 3.24 | 2.77 |
| 120 | 14 | 4.53 | 3.88 |
| 130 | 14 | 4.53 | 3.88 |
| 140 | 15 | 4.85 | 4.16 |
| 150 | 28 | 9.06 | 7.76 |
| 160 | 18 | 5.83 | 4.99 |
| 170 | 31 | 10.03 | 8.59 |
| 180 | 35 | 11.33 | 9.70 |
| entangled | 52 | — | 14.40 |
| total entangled | 52 | | |
| total curved | 309 | | |
| total | 361 | | |

Line 31 indicates the cumulative curve of the number of curved fibers having an angle α, less than the angle value in abscissa. This number is expressed, as indicated on the right ordinate 35, in percentage compared to the total number of curved fibers in the sample. More than 50% of the curved fibers have a major axis direction changing more than 90°.

As also indicated in FIG. 3, more than 10% of all short metal fibers out of the set of short metal fibers are entangled fibers. This is indicated by the dots 32, which represent the percentage of fibers, also to be read on the right ordinate 35, comprised in the related bar 33, compared to the total number of short metal fibers out of the sample taken from the set of short metal fibers.

Figure 4:
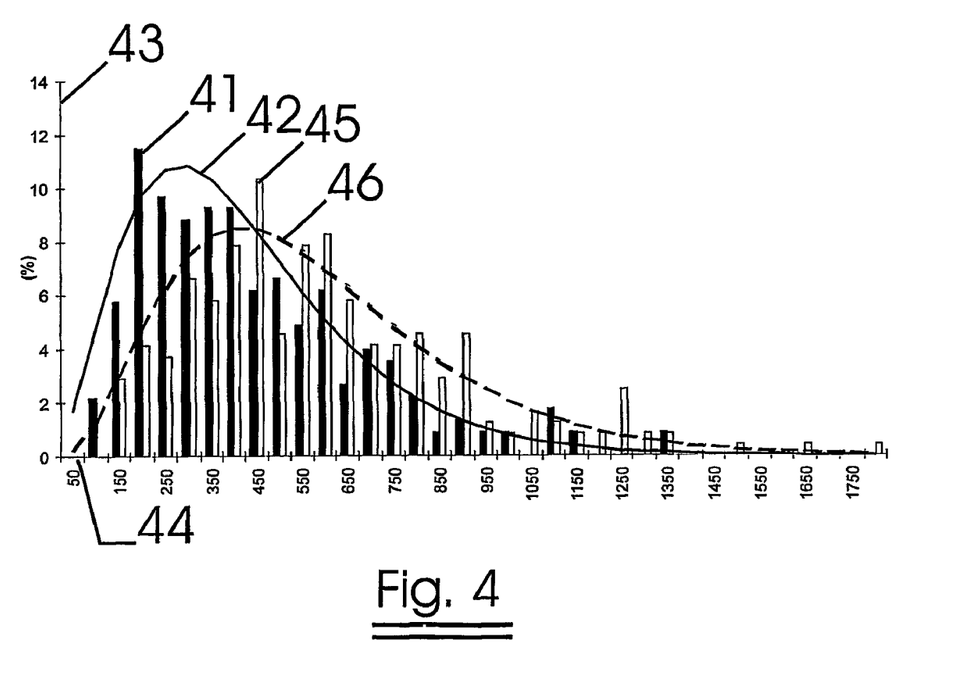
FIG. 4 shows a graph of the curvature distribution of the curved fibers out of a set of short metal fibers as subject of the invention

FIG. 4 shows the length distribution of the curved fibers of two sets of short metal fibers as subject of the invention.

A first length distribution 41, indicated with black bars, is a length distribution of the curved fibers of a set of short metal fibers, having an equivalent diameter of 8 μm. The set of short metal fibers was provided using bundle drawn stainless steel fibers, alloy AISI 302. A representative and randomly chosen sample of 227 fibers was taken. A n averagelength Lc of 420 μm was found. The length distribution is a gamma-distribution 42, being characterized with a shape factor S being 3.05. The bars of distribution 41 is to be understood as the percentage of curved fibers out of the sample (read in ordinate 43), which has a length (expressed in μm and indicated in abscissa 44) in the range with upper limit as indicated underneath the bar, and lower limit being the length indicated under the adjacent bar left if it. In the same way, the gamma-distribution reads the percentage of fibers in ordinate 43 in the range indicated on the abscissa 44 as explained above.

Another length distribution 45 is shown in FIG. 4, indicated with white bars, which is a length distribution of the curved fibers of a set of short metal fibers, having an equivalent diameter of 12 μm. The set of short metal fibers was provided using bundle drawn stainless steel fibers, alloy AISI 316L. A representative and randomly chosen sample of 242 fibers was taken. This length distribution accords to a gamma-distribution 46, which is characterized with a shape factor S being 3.72. An average length Lc of the curved fibers of 572 μm was measured.

A set of short metal fibers as of FIG. 3, was used to improve the resistance to thermal cracking and thermal shocks of a $ZrO_2$—MgO based ceramic glue.

A ceramic material, being a ceramic paste, which may be used as ceramic glue, was prepared using 77 gram $ZrO_2$—MgO based compound and 10 gram of water. An amount of a set of short metal fibers having an average equivalent diameter of 22 μm, of which the length distribution is provided as indicated with 45 in FIG. 4, is mixed in this ceramic paste, as indicated in Table I.

The ceramic paste was heated to a temperature of 600° C., and this temperature was kept for 90 sec. after which it was cooled to ambient in 60 sec. the number of cracks on an equal surface was counted, and is resumed in Table II.

TABLE II

| Temperature resistant matrix (ceramic matrix) (gram) | Set of short metal fibers of 12 μm (gram) | % of weight of short metal fibers (%) | Number of cracks (—) |
|---|---|---|---|
| 77 | 0 | 0 | 20 |
| 77 | 2 | 2.5 | 16 |
| 77 | 4 | 4.9 | 8 |
| 77 | 8 (sample I) | 9.4 | 0 |
| 77 | 8 (sample II) | 9.4 | 2 |

An identical result was obtained using a set of short metal fibers of 22 μm equivalent diameter.

The invention claimed is:

1. A temperature resistant material, comprising a temperature resistant matrix and a set of short metal fibers, wherein said set of short metal fibers represents at least 0.5% of weight of said temperature resistant material, said set of short metal fibers having an equivalent diameter D in the range of 1 to 150 μm, said set of short metal fibers comprises curved fibers and entangled fibers, said curved fibers having an average length Lc in the range of 10 to 2000 μm, said entangled fibers having an average length Le, said Le being more than 5 times said Lc, wherein at least some of said entangled fibers have a major axis which changes several times in a non-uniform manner.

2. A temperature resistant material as in claim 1, wherein at least 10% of said short metal fibers are entangled fibers.

3. A temperature resistant material as in claim 1, wherein the lengths of said curved fibers are distributed according to a gamma-distribution.

4. A temperature resistant material as in claim 1, L being an average length of fibers in said set of short metal fibers, wherein L/D is larger than 5.

5. A temperature resistant material as in claim 1, wherein Lc/D is larger than 5.

6. A temperature resistant material as in claim 1, said short metal fibers being stainless steel fibers.

7. A temperature resistant material as in claim 1, said temperature resistant matrix being a ceramic matrix or ceramic glue.

8. A temperature resistant material as in claim 1, said curved fibers having a major axis, said major axis having a direction, said direction changing more than 90° for at least 40% of said curved fibers.

9. A temperature resistant material as in claim 1, said temperature resistant material being a ceramic material.

10. A temperature resistant material as in claim 1, said temperature resistant material being a ceramic glue.

11. A temperature resistant material as in claim 1, said temperature resistant material being a temperature resistant glue.

12. A temperature resistant material as in claim 10, said ceramic glue comprising a ceramic matrix based on $SiO_2$, $Al_2O_3$, $ZrO_2$ and/or MgO.

13. A temperature resistant material as in claim 11, said temperature resistant material comprising a matrix based on $SiO_2$, $Al_2O_3$, $ZrO_2$ and/or MgO.

14. The temperature resistant material as in claim 1, comprising up to 20% by weight of short metal fibers.

15. The temperature resistant material as in claim 1, comprising up to 15% by weight of short metal fibers.

16. The temperature resistant material as in claim 1, comprising less than 10% by weight of short metal fibers.

17. The temperature resistant material as in claim 16, wherein the amount of short metal fibers is in the range of 1% to 9.5% by weight.

18. The temperature resistant material as in claim 1, wherein said entangled fibers have an average length larger than 200 μm.

19. The temperature resistant material as in claim 18, wherein said entangled fibers have an average length larger than 1000 μm.

* * * * *